United States Patent Office 2,695,641
Patented Nov. 30, 1954

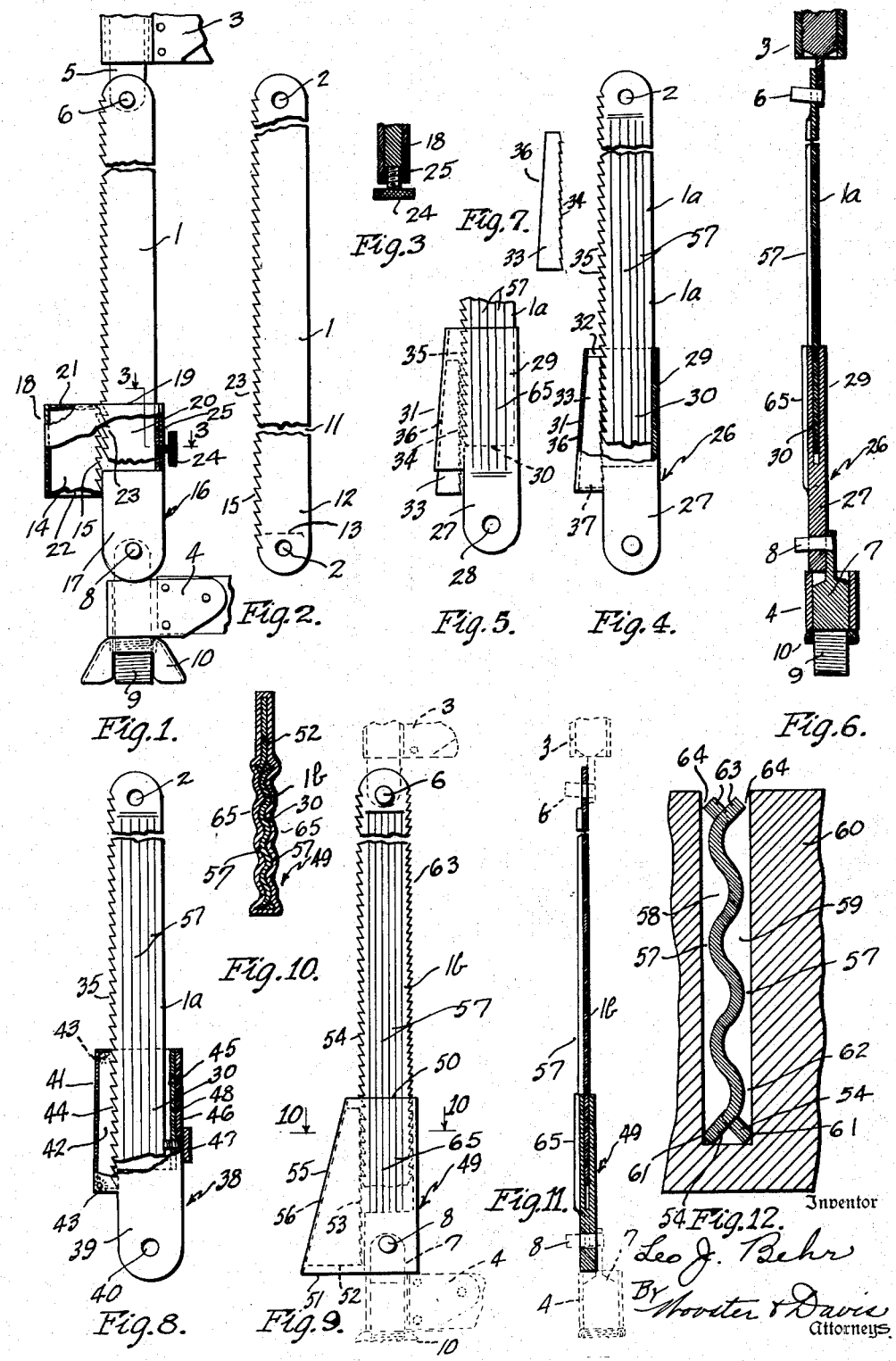

2,695,641

BROKEN HACK SAW BLADE HOLDER

Leo J. Behr, Bridgeport, Conn.

Application September 28, 1949, Serial No. 118,360

2 Claims. (Cl. 145—35)

This invention relates to hack saw blades, and has for an object to provide an improved means for mounting a broken hack saw blade in the saw frame, so that when the blade is broken it is not necessary to throw it away as is now common practice, but it is possible to continue using the blade.

Another object is to provide a device of this character in which the piece of broken blade may be used as a securing means for fastening the remainder of the blade at one end to the frame.

Another object is to provide a construction in which the broken end of the blade may be automatically secured to the frame by the act of tightening up the blade in the frame.

A further object is to provide a blade with improved strengthening means which will decrease the liability of the blades breaking in use, and further will provide a guide means for the blade in the cut or kerf in the work as the blade is used, which will hold the blade straight during the cutting operation and prevent its inclining to one side, and thus will make a straighter cut and greatly reduce the liability of the cut being inclined or directed to one side.

With the foregoing and other objects in view, I have devised the construction illustrated in the accompanying drawing forming a part of this specification. It is, however to be understood the invention is not limited to the specific details of construction and arrangement shown, but may embody various changes and modifications within the scope of the invention.

In this drawing:

Fig. 1 is a partial side elevation and partial section of a broken standard hacksaw blade showing a portion of the frame and the connecting device;

Fig. 2 is a side view of a standard hacksaw blade;

Fig. 3 is a detail section substantially on line 3—3 of Fig. 1;

Fig. 4 is a partial side elevation and partial section showing a modified construction of the securing means for the broken blade;

Fig. 5 is a side view of the securing means showing the locking wedge in released position;

Fig. 6 is a longitudinal section of the blade and securing means of Figs. 4 and 5 and also showing a portion of the frame in section;

Fig. 7 is a side view of the wedge used in the form of the device shown in Figs. 4 and 5;

Fig. 8 is a view similar to Fig. 4 showing another modification;

Fig. 9 is a side view of a still further modification;

Fig. 10 is a transverse section substantially on the line 10—10 of Fig. 9;

Fig. 11 is a longitudinal section of the device of Fig. 9, and

Fig. 12 is an enlarged section of a portion of a piece of work and my improved blade in the cut illustrating the improved operation of this blade.

It is well known that hacksaw blades are made very hard and this hardness makes them very brittle, causing extensive breakage of these blades in use, and they are generally thrown away as when broken there is no way of securing them in the frame. It is therefore an object of this invention to provide means whereby the broken blade may be mounted in the frame and used until it is worn to the point where it is no longer usable, thus permitting use of the blade even though broken for the normal life of the blade if it had not broken, and therefore greatly reducing wastage in use of the blades and of course reducing costs.

In the form of Figs. 1, 2 and 3 a standard hacksaw blade is shown at 1 provided with the usual openings 2 at its opposite ends for mounting it in the frame in which the blade is used, two spaced arms of which frame are shown at 3 and 4. However, the connecting bar is omitted. In one arm is the supporting element 5 carrying the inclined pin 6 for insertion in the opening 2 at one end of the blade, and in the other arm 4 is the slidable support or bolt 7 carrying a similar inclined pin 8 for insertion in the opening 2 in the other end of the blade, this support or bolt 7 being threaded at its outer end 9 for an adjusting wing nut 10 by which the proper tension may be placed on the blade and support it in the frame. It will be assumed now that the blade 1 has been broken at a short distance from one end, as indicated at the point 11, thus producing a short end piece 12. The end portion with the opening 2 may be broken off at about the location of the dotted line 13, leaving a short length of blade 14 having the teeth 15 along one edge. A holder or connector 16 is provided which has a flat end portion 17 provided with an opening for the mounting pin 8 and at the opposite end includes a hollow flat housing, or boxlike portion or head 18 in which the chamber on the inside is slightly wider than the thickness of the blade 1 and is open at the right hand half of the end 19 opposite and in alignment with the portion 17 to receive the broken end 20 of the longer part of the blade 1, as shown in Fig. 1. The other or upright portion of the other end of this boxlike construction 18 is closed as indicated at 21, but is open at its lower or opposite end 22 so that the short broken piece 14 may be inserted in this boxlike structure through this lower open end to one side of the inserted end portion 20, as shown in this view, and with its teeth 15 opposed to the teeth 23 of the end 20, but, however, reversed with relation to these teeth as indicated. On the opposite side of the structure 18 is a screw 24 threaded in the edge of the structure and pressing at its inner end against the edge of the inserted end 20 opposite the teeth 23. To secure greater length of thread for this screw an insert 25 may be provided on the inner side of the side wall and secured by welding or other suitable means. Now with the parts in the position shown in Fig. 1, if the screw 24 is screwed inwardly it will force the inserted end 20 of the blade to the left and lock its teeth 23 with the teeth 15 of the broken insert 14. Then by tightening up on the wing nut 10 the belt 7 may be drawn tightly in the frame in the usual manner, this bolt being secured to the blade 1 through the interlocking of teeth 15 and 23 of the two portions of blade, the insert 14 being held in the structure 18 by the end wall 21. Thus the broken blade can now be used the same as a whole blade.

In the form of the device shown in Figs. 4 to 7, the splicing or means for attaching the broken end of the blade 1a to the leg 4 of the frame comprises a device 26 having an extension 27 provided with an opening 28 to receive the pin 8 and a box-like housing structure or head 29 open at the top opposite the extension 27 to receive the broken end portion 30 of the blade. This structure is wider than the blade so that its edge 31 is spaced away from the edge of the inserted blade. This edge is also inclined, as shown, so as to provide between this edge wall and the blade a tapered space 32. In this space is inserted a tapered or wedge-shaped locking element 33 which is made substantially the thickness of the blade and has along one edge a series of teeth 34 corresponding to the spacing of the teeth 35 of the blade, while its opposite edge 36 is inclined to correspond with the edge wall 31. The space 32 is open at its lower or larger end 37 for insertion of this wedge-shaped locking element 33, as indicated in Figs. 4 and 5. In use, the element 33 and the broken end of the blade are inserted in the structure as indicated in Fig. 5, the element 33 being inserted as far as it will go, with the teeth 34 passing over the teeth 35. Then by tightening up on the bolt 7 the connector 26 is drawn downwardly, causing the inner surface of the inclined edge wall 31 to have a camming action on the corresponding inclined outer edge 36 of the element 33, and will force it to the right or inwardly to the position of Fig. 4, with its teeth 34 interlocked with the teeth on the inserted end portion 30 of the blade 1a. The pull or tension on the element 27 maintains this member 33 interlocked with the blade and will therefore prevent the blade from being pulled out of the connector 26, and it will be rigidly attached to the frame, permitting further use of the broken blade. A series of members 33 may be provided having different numbers and spacing of these teeth corresponding to the blades with which they are to be used.

In the form of Fig. 8 the connector 38 is of slightly different construction including the extension 39 provided with the opening 40 for insertion of the frame pin 8 and provided at its other end with the box or housing structure or head 41 open at the top to receive the broken end 30 of the blade 1a. The structure 41 is somewhat wider than the blade forming a space at the left hand side of the blade in which is mounted a locking insert 42. This may be permanently mounted in the structure 41 by any suitable means, such, for example, as welding, as shown at 43, and the inner edge of this locking member is provided with a series of teeth 44 corresponding to the spacing of the teeth 35 in the blade but directed in the opposite direction so as to be opposed to them. The spacing in the head structure 41 between the free edges of the teeth 44 and the opposite edge 45 of the space within this head is somewhat wider than the width of the blade 1a so that the end of the blade may be inserted in the head 41. In the edge 46 opposite to the locking member 42 is mounted a screw 47 with its inner end arranged to engage the edge of the blade 1a. With this screw retracted the broken edge of the blade may be inserted in the hollow head 41, and then the screw may be threaded in to force the blade to the left and bring its teeth 35 into locking engagement with the teeth 44 of the insert 42, as shown in Fig. 8. This securely locks the broken end of the blade 1a to the connector element 38 which will now be used to connect this end of the blade to the tightening element 7 of the saw frame and permit further use of the broken blade. More threads may be secured for the screw 47 either by thickening the side wall 46 or by welding a separate insert element 48 on the inner side thereof.

In the arrangement of Figs. 9, 10 and 11 the connector element 49 is a hollow box-like housing structure open at its upper end 50 for insertion of the blade 1b. This structure is also wider than the blade and open at its left hand side at its lower end 51 for insertion of a wedge-shaped locking element 52 corresponding to the locking element 33 of the form of Figs. 4 and 5. This tapered or wedge-shaped element has a series of teeth 53 on its straight inner edge corresponding to the spacing of the teeth 54 of the blade and facing in the opposite direction so as to be opposed to the teeth 54. At its left hand edge this structure 49 is inclined, as shown at 55, and the corresponding edge 56 of the insert or wedge 52 is similarly tapered. This device is used the same as the form of Figs. 4 and 5. That is, the broken end of the blade 1b is inserted in the open end 50 of the connector 49 and the locking member 52 is inserted from the lower end to bring its teeth 53 opposite the teeth 54 of the blade. Then by tightening up on the holding element or bolt 7 the connector 49 is drawn downwardly somewhat with relation to the blade causing its inclined wall 55 to have a camming action on the edge 56 of the insert 52 and therefore force it to the right to cause its teeth 53 to interlock with the teeth 54 of the inserted end porion of he blade. This effectively locks the connector 49 to the broken end of the blade, and as the connector is secured to the adjusting bolt 7 the blade may be tightened as previously described and may be used the same as an unbroken blade.

The blades 1a and 1b are provided with a series of longitudinally extending ribs or corrugations 57 running substantially the full length of the blade, thus forming longitudinal ribs and grooves 57 and 58 on opposite sides of the blade. This greatly strengthens the blade, materially reducing the liability of breakage and these corrugations or ribs also provide guiding means for the blade in the cut as it is formed in the work to thus hold the blade straight in the cut, preventing it from inclining laterally. Thus the blade will pass straight through the work with a straight cut instead of a laterally inclined cut as is apt to be formed unless the operator is very skilled and great care is taken to maintain the blade straight.

As is well known, the teeth of the blade are given a set, that is, alternate teeth are bent laterally in opposite directions, as shown in Fig. 12, so as to make the width of the cut 59 in the work 60 slightly wider than the body of the blade to provide clearance and prevent binding of the blade as it passes through the cut. To maintain this clearance, the width of the blade between the high edges of the ribs 57 is made slightly less than the distance between the outer edges 61 of the teeth providing a clearance space 62, which of course is greatly exaggerated in Fig. 12. The blade 1b, however, is provided with teeth on both edges, the edge opposite teeth 44 being provided with teeth 63. These teeth may be of the same size and number as the teeth 54, but it is preferred to provide a different number of teeth on the opposite edges so that the same blade may be used for different types of work. The cut made by the teeth 63, however, is somewhat less than that of the teeth 54, so that the distance between their opposite outer edges 64 is somewhat less than the distance between the outer edges 61 of the teeth 54, so that as the blade follows into the cut 59 made by the teeth 54 there will be clearance between the outer edges of these teeth 63 and the sides of the cut. However, the setting of these teeth 63 is such that the distance between their outer edges 64 is somewhat greater than the thickness between the high points of the opposite ribs 57 so that there is clearance between the sides of the cut and these ribs when either side of the blade is used for a saw cut. For example, the width between the edges 61 may be .090" and that between the edges 64 of the teeth 63 .085", and the width between the high points 57 on opposite sides of the blade about .075", or even as great as .080", but the lesser thickness is preferred to allow for wear of the outer edges of the teeth and thus maintain the clearance between the sides of the cut and the high surfaces of the corrugations to prevent binding.

In the form of the device of Figs. 4, 5 and 9, the blade has only longitudinal movement in the connectors 26 and 49. It is preferred to shape these connectors to correspond with the blade by corrugating its side walls corresponding to the blade corrugations, as indicated at 65 in Fig. 10. However, this is not necessary as the side walls of the connectors could be straight or flat and spaced slightly greater than the distance between the outer edges 61 of the cutter teeth.

In the form of Fig. 8, as the inserted end of the blade is shifted laterally in the connector 38, the side walls of this connector are not corrugated but are left flat and spaced slightly greater than the width between the outer edges of the teeth 35, so that the space is wide enough for insertion of the blade.

It will be understood from the above that this device comprises a very simple and effective means for securing the broken end of a hacksaw blade in the hacksaw frame, permitting further use of the blade after it is broken and thus permitting full use of the blade until it is worn out, and removing the necessity of throwing the broken blades away until they are so worn. The connectors are made of the proper size for the blades used and may be used with the smaller or hand saws, or larger sizes may be made for use with the larger or machine operated blades. It will be evident that the connection of the broken end of the blade to the conector may be made easily and quickly, and that by the use of interlocking teeth the broken end of the blade is so locked in the connector that there is no danger of its being pulled from it either in tightening the blade in the frame or in the use of the blade. The corrugations in the blade are a material improvement in not only strengthening the blade to reduce breakage but also in guiding the blade in the cut so as to keep it straight and make it much easier to make a straight cut, and this guiding action is secured even in a shallow cut by the first or second ribs or corrugations immediately back of the cutter teeth. Any desired number of these corrugations may be used as found desirable or expedient.

Having thus set forth the nature of my invention, I claim:

1. In a hack saw, a blade comprising a strip of metal provided with longitudinal corrugations and with an opening in one end for securing it to one arm of a hack saw frame, a connector including a housing structure provided with an elongated opening for insertion into the housing of a broken end of said blade opposite said securing opening, holding means in the housing at one side thereof including a wedge-shaped member provided on one edge with a series of teeth facing in the opposite direction from the teeth on one edge of the inserted blade end and adjacent thereto, one side of the housing engaging the other edge of the wedge to shift it toward said blade to interlock its teeth therewith and hold it in this position to connect the broken end of the saw blade to said connector, at least one side wall of the connector being longitudinally corrugated to correspond with the blade, and said connector being provided with means for securing it to the other arm of said frame.

2. In a hack saw, a blade comprising a strip of metal provided with longitudinal corrugations and with an opening in one end for securing it to one arm of a hack saw frame, a connector including a housing structure provided with an elongated opening for insertion of a broken end of said blade opposite said securing opening into the housing and at least one side wall provided with corrugations corresponding with those of the blade, holding means comprising an insert in the housing provided with a series of teeth facing in the opposite direction from the teeth on said inserted portion of the blade and adjacent thereto, said insert being tapered with an inclined edge on the opposite side thereof from the teeth, the housing having a similarly inclined edge wall to engage said inclined edge of the insert and cooperate therewith to shift the insert toward the blade to engage its teeth with teeth on the inserted end of the blade by movement of the housing in a direction to withdraw it from the blade, and said connector being provided with means for connecting it to the other arm of the frame.

References Cited in the file of this patent

UNITED STATES PATENTS

| Number | Name | Date |
|---|---|---|
| 877,146 | Ward | Jan. 21, 1908 |
| 1,043,405 | Dogenais | Nov. 5, 1912 |
| 1,173,164 | Berkman | Feb. 29, 1916 |
| 1,175,582 | Bangent | Mar. 14, 1916 |
| 1,369,178 | Lawrence | Feb. 22, 1921 |
| 1,410,310 | Howard | Mar. 21, 1922 |
| 1,512,904 | Brennan | Oct. 28, 1924 |
| 1,752,586 | Bolinder | Apr. 1, 1930 |
| 1,882,328 | Kinkel | Oct. 11, 1932 |
| 2,365,301 | Shortell | Dec. 19, 1944 |

FOREIGN PATENTS

| Number | Country | Date |
|---|---|---|
| 36,392 | Sweden | Mar. 18, 1914 |
| 390,871 | Germany | Feb. 25, 1924 |